United States Patent
Bermundo et al.

(10) Patent No.: US 11,050,836 B1
(45) Date of Patent: Jun. 29, 2021

(54) CLOUD-BASED CLIPBOARD

(71) Applicant: KYOCERA Document Solutions Inc., Osaka (JP)

(72) Inventors: Neil-Paul Payoyo Bermundo, Glendora, CA (US); Mohamed Al Sayed Mostafa, Hawthorne, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/753,000

(22) Filed: Jan. 27, 2020

(51) Int. Cl.
*G06F 13/00* (2006.01)
*H04L 29/08* (2006.01)
*H04L 29/06* (2006.01)
*G06F 21/62* (2013.01)

(52) U.S. Cl.
CPC ...... *H04L 67/2819* (2013.01); *G06F 21/6218* (2013.01); *H04L 63/105* (2013.01); *H04L 67/16* (2013.01); *H04L 67/42* (2013.01)

(58) Field of Classification Search
CPC ... H04L 67/2819; H04L 67/16; H04L 63/105; H04L 67/42; G06F 21/6218
USPC .......... 709/229, 225, 203; 715/748, 751–759
See application file for complete search history.

(56) References Cited

U.S. PATENT DOCUMENTS

| | | | |
|---|---|---|---|
| 5,765,156 A | 6/1998 | Guzak et al. | |
| 5,926,633 A | 7/1999 | Takagi et al. | |
| 5,964,834 A | 10/1999 | Crutcher | |
| 6,256,109 B1 | 7/2001 | Rosenbaum et al. | |
| 7,870,493 B2 | 1/2011 | Pall et al. | |
| 7,945,681 B2 | 5/2011 | Witkowski et al. | |
| 8,274,677 B2 | 9/2012 | Asano | |
| 9,069,511 B2 | 6/2015 | Yamada | |
| 9,647,991 B2* | 5/2017 | Dowd | G06F 3/04883 |
| 9,946,805 B2* | 4/2018 | Kim | G06F 16/957 |
| 10,382,404 B2* | 8/2019 | Dowd | H04L 67/2842 |
| 2001/0054092 A1 | 12/2001 | Vaha-Sipila et al. | |
| 2010/0245892 A1 | 9/2010 | Takahashi | |
| 2012/0096368 A1* | 4/2012 | McDowell | G06F 9/543 715/748 |
| 2013/0013400 A1* | 1/2013 | Kim | G06Q 10/10 705/14.49 |
| 2013/0013401 A1* | 1/2013 | Kim | G06Q 10/10 705/14.49 |
| 2013/0013986 A1* | 1/2013 | Kim | G06F 16/957 715/201 |
| 2014/0267339 A1* | 9/2014 | Dowd | H04M 1/00 345/581 |

(Continued)

OTHER PUBLICATIONS

"Use AceText as a Windows Clipboard Viewer, Editor and Manager" published by Just Great Software Co. Ltd, Jan. 9, 2020, http://www.acetext.com/clipboard.html.

(Continued)

*Primary Examiner* — Kenneth R Coulter
(74) *Attorney, Agent, or Firm* — W. Eric Webostad

(57) ABSTRACT

Systems and methods relate generally to a cloud-base clipboard are disclosed. In an example thereof, a client service is executed on a client device of a group of client devices. Data going to or from a clipboard store of the client device is intercepted. The intercepted data is automatically sent from the client device to a server. A listing service is run on the server. The intercepted data is stored by the listing service on or accessible by the server in a list directly available to at least two in the group of client devices.

20 Claims, 9 Drawing Sheets

(56) References Cited

U.S. PATENT DOCUMENTS

2017/0230343 A1\* 8/2017 Dowd ................ G06F 3/03545
2017/0262294 A1   9/2017 Yakan

OTHER PUBLICATIONS

"LaunchBar's Clipboard History" published by Objective Development Software GmbH, 2019, https://www.obdev.at/resources/launchbar/help/ClipboardHistory.html and https://www.obdev.at/products/launchbar/features.html.
"Network Clipboard" published by Interdesigner Software Development, 2019, http://www.interdesigner.com/NetworkClipboard/.
"BeyondCopy" by Catkin Liu, published by GNU, 2003, https://beyondcopy.sourceforge.io/.

\* cited by examiner

CLOUD-BASED CLIPBOARD

FIELD

The following description relates to a cloud-based clipboard. More particularly, the following description relates to a cloud-based clipboard for multiple client devices.

BACKGROUND

Conventionally, when sharing data such as text, images or files between devices a user might upload such data up to a cloud-based storage from one device by pasting a file for same into a folder and then having such cloud-based storage separately download such data from such cloud-based storage to another device, which then can be accessed by going into a folder on such other device. However, this is inconvenient when with two computers or devices side-by-side and annoying when just transferring a small amount of data, such as a string of code or text. The inconvenience compounds when there are multiple computers or devices one or more of which are not co-located. The inconvenience further compounds when there are multiple users sharing data.

SUMMARY

In accordance with one or more below described examples, a system relating generally to a cloud-based clipboard is disclosed. In such a system, a client service executable on a client device of a group of client devices is configured to intercept data going to or from a clipboard store of the client device and to send the intercepted data to a server without user intervention. The server configured for communication with the client device has a listing service for storing the intercepted data in a list on or accessible by the server for direct availability to at least two in the group of client devices.

In accordance with one or more below described examples, a method relating generally to cloud-based clipboard printing is disclosed. In such a method, a client service is executed on a client device of a group of client devices. Data going to or from a clipboard store of the client device is intercepted. The intercepted data is automatically sent from the client device to a server. A listing service is run on the server. The intercepted data is stored by the listing service on or accessible by the server in a list directly available to at least two in the group of client devices.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block diagram depicting an exemplary "cloudboard" system with a printing device.

FIG. 2 is a flow diagram depicting a high-level example of a process flow for the cloudboard system of FIG. 1-2.

FIG. 3-1 is a flow diagram depicting an example of a process flow for the cloudboard system of FIG. 1-1.

FIG. 3-2 is a flow diagram depicting an example of a process flow for the cloudboard system of FIG. 1-2.

FIG. 4-1 is a flow diagram depicting an example of an operations flow for the process flow of FIG. 3-1.

FIG. 4-2 is a flow diagram depicting an example of an operations flow for the process flow of FIG. 3-2.

DETAILED DESCRIPTION

Figure 1:
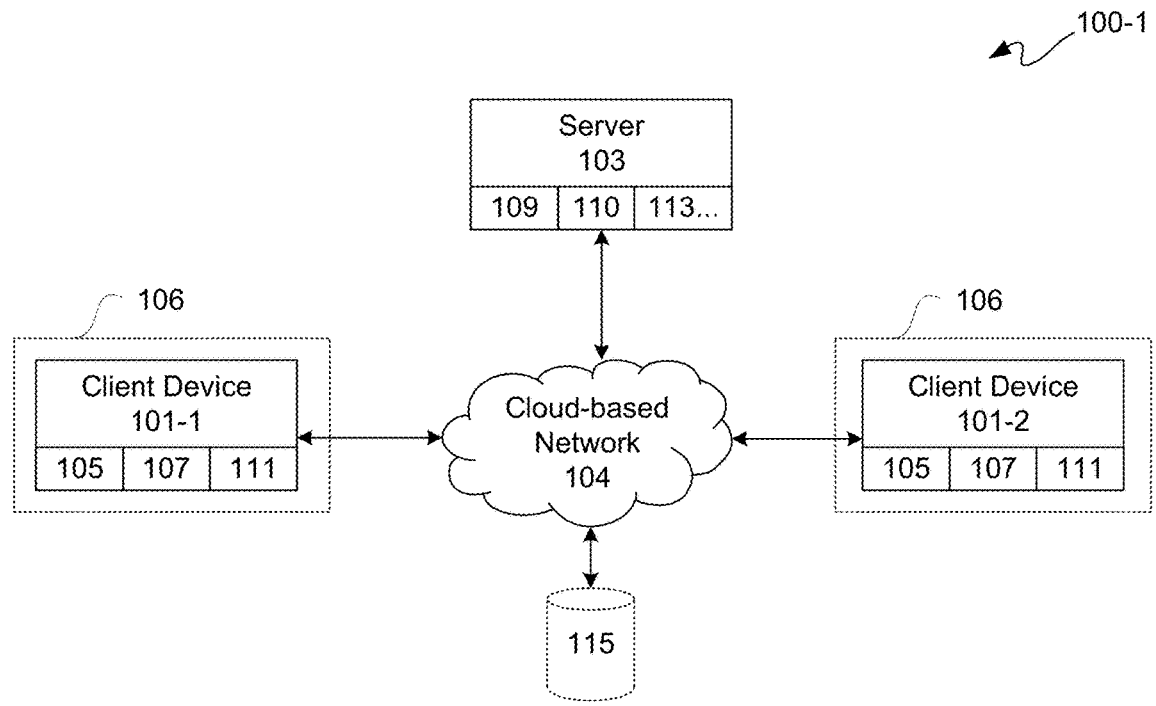
FIG. 1-1 is a block diagram depicting an exemplary "cloudboard" system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Sharing a message (e.g., text message, chat message, email, copied text into clipboard, notes) from one PC to another for example may mean copying a file from one PC to another either by a remote session or by first saving such message to a shared network storage or by first emailing the message to one's self. Heretofore, simple copy-paste steps could accomplish this sharing. Without manual copying or saving data to network storage or without emailing to one's self, the "paste" step could result in unexpected data to be pasted. If the scenario is extended to multiple people sharing a message, the situation gets worse.

As described below in additional detail, a client-server architecture may be used with a "cloudboard" store to provide a sharable repository of data among multiple clients. Client copied data may be automatically intercepted and uploaded to such "cloudboard" store for sharing among such multiple clients. In an example, a printing device may be a client of such multiple clients, and such printing device may be configured to access such cloudboard store for printing therefrom.

With the above general understanding borne in mind, various configurations for cloud-based clipboard and cloud-based clipboard printing systems and methods are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a block diagram depicting an exemplary "cloudboard" system 100-1. In this example, "cloudboard" system 100-1 includes client devices 101-1 and 101-2, a server 103, and a cloud-based network 104. However, in another example, more than client devices 101-1 and 101-2 of a group of client devices 106 may be present. Furthermore, in another example, more than one server 103 may be present. Server 103 may be a cloud-based or enterprise network-based server.

Use of a cloud-based network 104 facilitates client devices 101-1 and 101-2 ("client devices 101") in wireless communication with such network. Along those lines, client devices 101 may be mobile devices, such as for example notebook computers, smart phones, tablets, or other mobile devices, or combinations thereof. Client devices 101 may include local storage for a clipboard store, as described below in additional detail.

A client service 105, which may be implemented in machine readable code, may be stored in and run by a client device 101-1, such as for execution by a processor thereof. Client services 105 may run as system services in client devices 101 to intercept data going in and out of a local clipboard store ("clipboard") 107 for a shared "cloudboard" store 110. In this example, a cloudboard store 110 is located in storage of server 103 and shared by client devices 101 via cloud-based network 104. By "cloudboard" store it is generally meant a shareable cloud-based storage for storing one or more copied and/or cut items remotely with respect to a user's device used to perform such copying and/or cutting, respectively, and accessible for pasting such one or more items locally with respect to one or more remote user devices. The term "cloudboard" and variations thereof is used hereinbelow for purposes of clarity to convey existence or use of such a shareable cloud-based storage.

Client service 105 may be configured to maintain a local list 111. In an example, list 111 may be a "most-recently-used" list of copied or cut items. However, intercepts of copied or cut items may be to or from clipboard stores respectively of at least two of a group 106 of client devices 101.

List 111 may be in memory of client device 101-1 for example. List 111 may include indices to data, files, and/or data (hereinafter collectively and singly "items" or "data") that have gone into a local clipboard 107. Items stored in list 111 may be associated with copy, cut, and/or paste actions. For example, items added to list 111 may be from user "Ctrl-C" or other "copy" actions performed on an associated client device 101. In an example, latest items may be put at the top of list 111. Similarly, items stored in list 111 may be from "Ctrl-X" or other "cut" actions.

One or more items may be selected from list 111 by "Ctrl-V" or other "paste" actions. "Copy", "Cut" or "Paste" actions can happen anywhere, in one client device 101 or another, or in one OS or another, in a network in "cloud-board" system 100-1. A selected item "copied" or "cut" using client device 101-1 may be made available in another client device 101-2 by "paste" action by a user of client device 101-2 via cloudboard store 110. Similarly, an item "copied" or "cut" from one OS in a same or different client device may be made available to "paste" in another OS in same or a client device via cloudboard store 110.

For example, a list 111 may be maintained and managed on a per-user-account basis, per-department basis, or some other grouping basis in client devices 101. Each client device 101 may have a local list 111 with items of data locally stored so as not to have to go to cloudboard store 110 for each paste action for example. However, in another example, a local list 111 may include only indices to items stored by cloudboard store 110, such as for additional security. Items not locally stored but on list 111 may have indices pointing to corresponding data for example in cloudboard store 110. These indices may be addresses pointing to data in cloudboard store 110 for retrieval by and to a client device 101.

Server 103 may be configured for communication with client devices 101. Server 103 may run in a cloud or as a network server for enterprise use. Server 103 may be a central repository of all data being shared by one or more users in group 106. Server 103 may be configured to maintain a list of users or grouping categories that have permissions to share data among one another. Server 103 may be configured to maintain a list of data that can be private to a user, such as for personal use, another list of data that can be shared to a selected number or set of users, and/or another list of data that can be shared publicly. Server 103 may be configured to have assignable categories or groupings for one or more groups 106, such as by departments, teams, offices, addresses, and/or other user-definable categories.

Server 103 may execute a listing service 109 for storing client-side intercepted data in a cloudboard store 110 with an associated list 113 on or accessible by server 103 and client devices 101. List 113 may be configured for direct availability to at least two of a group 106 of client devices 101 for accessing associated data in cloudboard store 110. Accordingly, rather than having to move significant amounts of data from server 103 to a client device 101 to provide all such data to such client device, a client device 101 may access a list 113 on server 103. For a client selected item on list 113, such associated item in cloudboard store 110 may be sent to a client device 101, such as a client device requesting such item. In an example, data associated with such client selected item may be transferred or pasted into an application run on a client device making such request, and such data may be provided to clipboard 107 with a corresponding entry in list 111. However, in another example, data associated with such client selected item may be transferred or pasted into an application run on a client device making such request, and an index to such data in cloud board 110 may be provided to list 111 for any subsequent paste action. This may reduce data storage requirements of clipboard 107. In general, a locally maintained list 111 may include one or more locally or internally generated items of a client device 101-1 for example and/or one or more remotely or externally generated items of a client device 101-2 within a group 106.

Listing service 109 may be configured to manage more than one most-recently-used list, such as for example a personal list, a shared list, a public list, and/or one or more other user-defined categories (e.g., department, team, or office). Moreover, there may be several shared most-recently-used lists for different organizations or categories of groups, such as contacts, friends, co-workers, or other people.

To recapitulate, cloudboard system 100-1 includes a client service 105 executable on a client device 101-n of a group of n, for n a positive integer greater than zero, client devices 101 to intercept data going to or from a client device local clipboard 107. A list 111 of such client device 101 may indicate locally stored items or server stored items, or a combination thereof. A locally run client service 105 may be configured to send such intercepted data to a server 103. Such intercepted data may be sent to server 103 without user intervention, as a user does not need to place such copied or cut data onto or into cloudboard store 110 for shared access. Server 103 may be configured for communication with client devices 101, and server 103 may execute a listing service 109 for storing client-side intercepted data in a cloudboard store 110 with an associated list 113 on or accessible by server 103 for direct availability to at least two of a group 106 of client devices 101.

Cloudboard store 110 may be used to alleviate and/or save steps in sharing, copying and/or transferring of data, such as for example chat messages, emails, URLs, text messages, images, screen shots, documents, or files, between computing devices, such as desktops, laptops, tablets, mobile phones, or other portable computers. As a default for "copy/cut/paste" actions, data may be placed or gotten to or from a top of list 113 of cloudboard store 110, and such actions may be performed in the background.

Moreover, cloudboard store 110 may be used in dual-boot systems or multi-OS platforms, such as for example copying some message, text or data from a first OS, booting to a second OS, and having such copied data readily available in such second OS without any other steps. Such copied data may be used for example in filling out forms, text fields, source code file, or other uses. A computer with a dual-boot Operating System ("OS"), or a computer that has multiple Operating Systems installed, such as one main OS (e.g., Windows) and one or more other or secondary Operating Systems (e.g., Linux, Windows 7, Windows 2012 server, and/or MacOS) may be used in an example implementation. Because cloudboard store 110 is shared by two or more of such Operating Systems installed in the same computer, cloudboard store 110 may make transferring data from OS instance to another OS instance convenient to a user.

Cloudboard system 100-1 may be configured to allow a user to be logged into multiple client devices 101 at the same time. A user logged into multiple client devices 101 at the same time may imply such user uses the same login account in different client devices, such as a smart phone, a tablet and a notebook computer. In other words, cloudboard system 100-1 may be configured to allow for a multi-session for a same user. In such a configuration, a user may have cloudboard client service 105 running in each such client device 101, which may imply the same connection and credentials for such user in cloudboard system 100-1. Cloudboard server 103 may be configured to recognize such user is connected from different places, sources, and/or client devices 101. Cloudboard server listing service 109 may be configured to track a latest or most recent "copy", "cut" or "paste" action occurring in cloudboard system 100-1 for a user and may be configured to re-arranging a most-recently-used list 113 for such a user accordingly.

A user may be allowed to rearrange a most-recently-used list to put some data that user will need in next "paste" action and place that data to the top of such list. Authorized users that share a most-recently-used list may be allowed to same or similarly rearrange such a list from their view of a shared or common list.

Besides "ctrl-c/x/v" or "copy/cut/paste" actions, cloudboard system 100-1 may be configured to have input entry via context menus, such as for example a mouse right-click on data or in File Explorer or inside a document editing application, such as for example MS Word. In such context menus, a "Copy to CloudBoard", "Cut to CloudBoard", "Paste from CloudBoard", or same or similar commands may be listed as one or more selections for explicit routing to/from cloudboard store 110. Such context menu items may expose features and services in an explicit user interface for a user.

Cloudboard system 100-1 may be useful to document, write code, gather data, or tally numbers, among other applications, involving sharing of data, such as text, images or files, between client devices 101, which may be local to one another, such as side-by-side, or remote from one another, such as separated by a significant distance. For example, when writing code, there can be instances where such code is to be copied from one computer to another. Another example is when propagating bug fixes to multiple computers so many other projects (sometimes called horizontal development) may have immediate access. Along those lines, code from one project may be integrated into files in one or more other projects in some instances.

Cloudboard system 100-1 may be thought of as a shared system and service that can cache an array or list of texts, messages, emails, webpages or URLs, images or files over a network or cloud, and make shared data available and browsable anywhere, from multiple computers or multi-boot/multi-OS systems. Cloudboard system 100-1 includes a shared cloudboard store 110, which is a shared cache type of service that can hold text, image, or files over a network or cloud. In an example, cloudboard system 100-1 may display a list of most-recently-used data made available over a network or cloud, and such list of data can be selected and activated for use as clipboard data of a client device 101 though such data may be resident on cloudboard store 110. Again, data may be re-arranged so various users sharing data can have preferred data be next available data from cloudboard store 110.

Optionally, cloud-based network 104 may include or be coupled for communication with a network storage device 115 configured to perform operations of server 103. However, for purposes of clarity and not limitation, use of a server 103 is presumed.

Figures 1, 2:
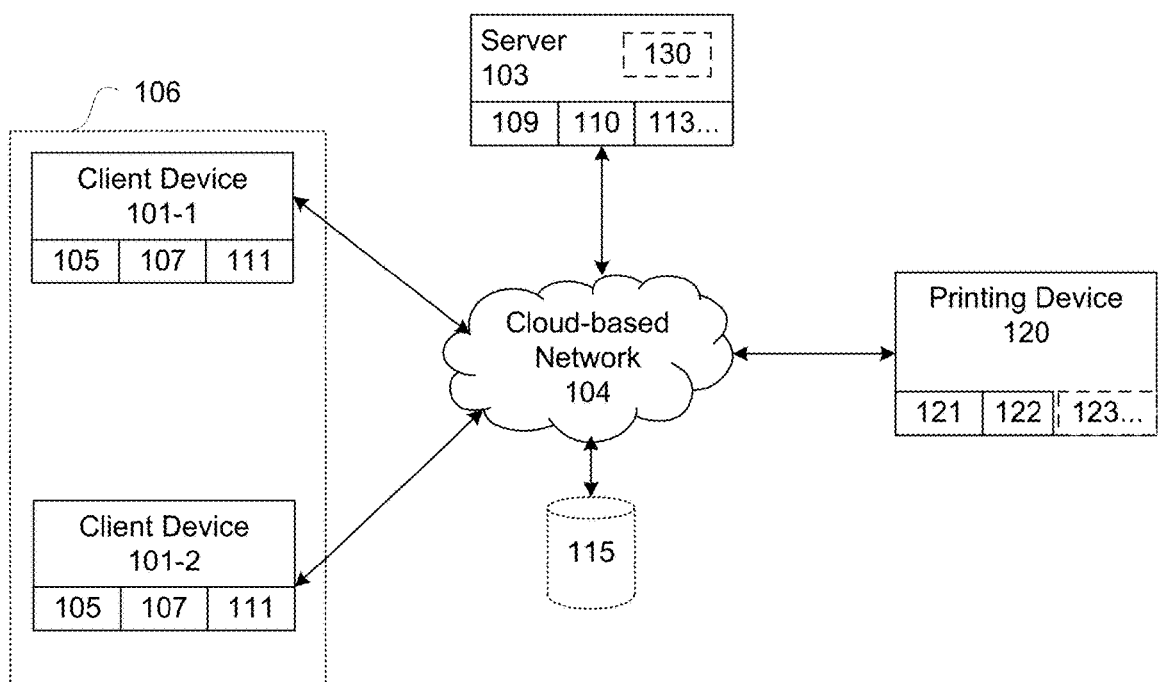
Figure 2:
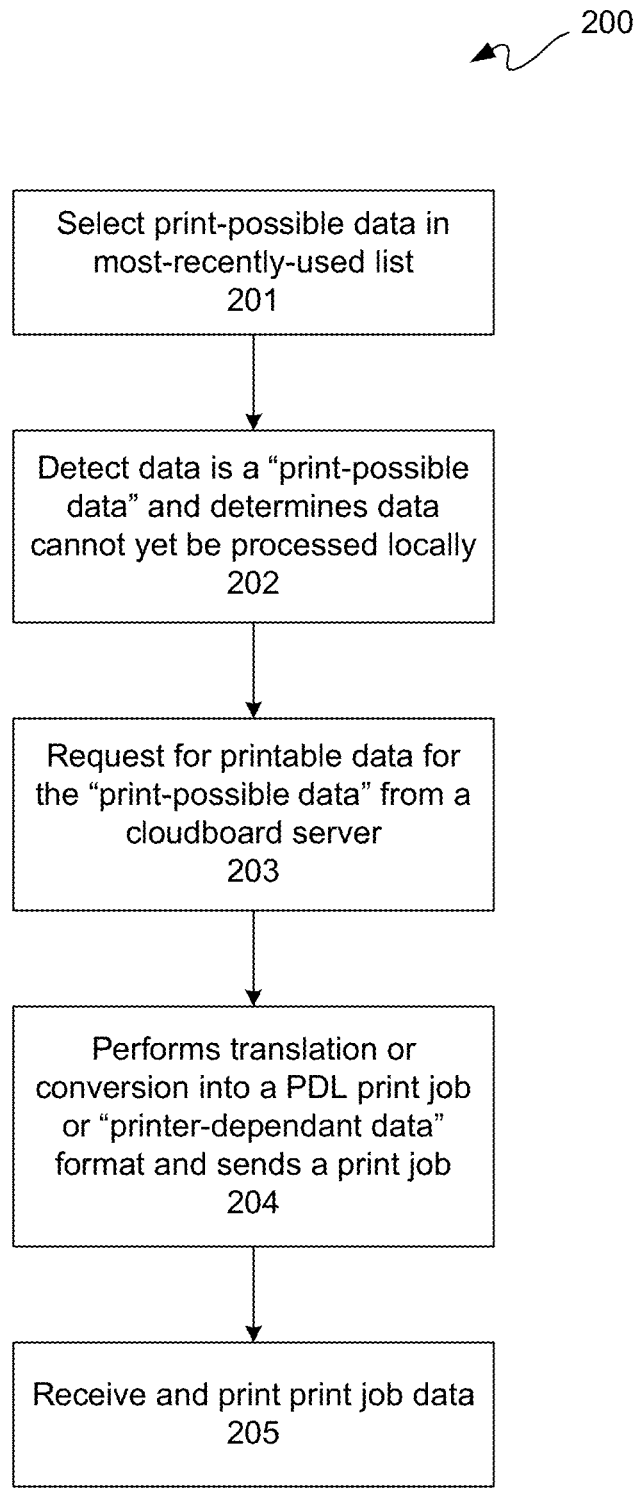

FIG. 1-2 is a block diagram depicting an exemplary cloudboard with printing device system ("cloudboard system") 100-2. In this example, cloudboard system 100-2 is the same as cloudboard system 100-1 but with addition of a printing device 120. Printing device 120 may be put in communication with one or more client devices 101 and/or server 103 via a cloud-based network 104.

In this example, printing device 120 is a multi-function printer ("MFP"). However, in another example, printing device 120 may be a dedicated printing-only printer. Printing device 120 includes a control service 121, which may reside in cloudboard plug-in firmware of an MFP for example. Control service 121 may be configured to gain access to a most-recently-used list 113 stored on cloudboard server 103. Optionally, printing device 120 may have a local version of list 113 stored in memory of such printing device, such as optional local "most-recently used" list 123. Local "most-recently used" list 123 may be updated by control service 121 making calls to listing service 109 and/or "most-recently used" list 113 for updating. However, for purposes of clarity and not limitation, it is assumed that on-demand downloading of data from cloudboard store 110 is used without a printing device local "most-recently used" list 113.

Control service 121 may be configured to allow printing device 120 to perform an on-demand download of any data in cloudboard store 110 that user may have permission to and allow printing of such downloaded data on printing device 120. Such downloaded data can be used to fill out forms or templates that may be shown in a printer display panel 122 of printing device 120.

Types of printable data that can be processed through cloudboard store 110 for printing device include print-ready or native data, print-possible data, and printer-dependent data. Print-ready or native data includes plain text files, chat messages, plain text email messages, plain text web pages, JPG, TIFF or other image files that printer engines can process natively through raster image processor ("RIP") firmware of printing device 120. Print-possible data include document files (e.g., MS Word, PowerPoint, and the like), HTML or web pages, URL links, email in RTF or formatted text, and other file formats processed through a printer driver of printing device 120. Printer-dependent data includes page description language ("PDL") print jobs such as PCL5, PCL6, PDF, PPML, XPS and the like, which are files that can be transferred directly to printer that can parse and interpret PDL.

Via printing device 120, a user may view items of most-recently-used list 111 accessible to user's login account. A user logged into multiple client devices 101 at the same time may imply such user uses the same login account in different client devices, such as a smart phone, a tablet and a notebook computer. In other words, cloudboard system 100-1 may be configured to allow for a multi-session for a same user. In such a configuration, a user may have cloudboard client service 105 running in each such client device 101, which may imply the same connection and credentials for such user in cloudboard system 100-1. Along those lines, a login to printing device 120 for displaying a list on a display panel may be used as a client login, namely treating a printing device 120 as a client. When a user opens forms, templates, or text fields, for example, in printer's display panel 122, and when user holds for example a field for a few seconds, most-recently-used list 111 may be shown and user can pick which item to use in a form or field being filled. A paste action from cloudboard store 110 may be provided in a pop-up menu on panel 122 so a user can put text from list 111 into a form or field being filled. Similarly, a user can highlight and click on any text in printer panel 122, such as in a browser in display panel 122 that has a web page, document, or other text open that may be useable as data, and be able to see a copy to cloudboard store 110 option.

With simultaneous reference to FIGS. 1-1 and 1-2, cloudboard systems 100-1 and 100-2 each have a cloudboard server 103 and cloudboard client devices 101 running client services ("clients") 105. Cloudboard server 103 may provide a centralized listing service 109 communicating with cloudboard clients 105. Cloudboard clients 105 exchange information with listing service 109 by uploading any addition or deletion of items or data in a locally maintained most-recently-used list 111. Cloudboard server 103 updates a global and shared most-recently-used list 113 responsive to locally maintained most-recently-used lists 111 of cloudboard clients 105. Cloudboard server 103 listing service 109 updates connected cloudboard client devices 101 with refreshed "most-recently-used list" 103. This allows such local lists 111 to reflect items in list 113 but on client devices 101 where clients 105 run. A "most-recently-used list" differs from a first-in, first-out list, as an item may be added to a "most-recently-used list" after another item but be moved to a higher position in such list based on usage.

Effectively cloudboard systems 100-2 adds to cloudboard system 100-1 a printing-device-based cloudboard client as a control service 121 to gain access to a most-recently-used list 113 stored on cloudboard server 103. Server 103 may optionally be configured with a printer driver 130 for printing device 120. FIG. 2 is a flow diagram depicting an example of a process flow 200 for a cloudboard system 100-2.

At operation 201, a user of a printing device 120 selects print-possible data itemized in a most recently used list 113 displayed at such printing device, such as on display panel 122. A display name or full path name for example may be used for displaying such items. For example, cloudboard plug-in firmware for an MFP may have access to a most-recently-used list 113 in cloudboard server 103. This access allows a logged-on user, which may be through user authentication in printer panel, to browse such most-recently-used list or lists 113 that a user has access to or that are shared to such user.

At operation 202, control service 121 of printing device 120, such as an MFP for example, detects that data selected at operation 201 is a print-possible data. Furthermore, at operation 202, control service 121 determines that such selected data is not currently local to or resident in printing device 120 for processing, but rather is to be downloaded from cloudboard server 103.

At operation 203, control service 121, which for example may be a cloudboard plug-in firmware in an MFP, requests data selected at operation 201 and determined as print-possible data at operation 202 to be downloaded from cloudboard store 110 of cloudboard server 103 to such printing device 120. At operation 204, cloudboard server 103 responsive to a request initiated at operation 203 performs a translation or conversion of selected print-possible data into a PDL print job or a printer-dependent data format for printing by printing device 120. At operation 204 such translated or converted data is sent as a print job to printing device 120. At operation 205, printing device 120 receives and prints such print job data.

Figures 1, 3:
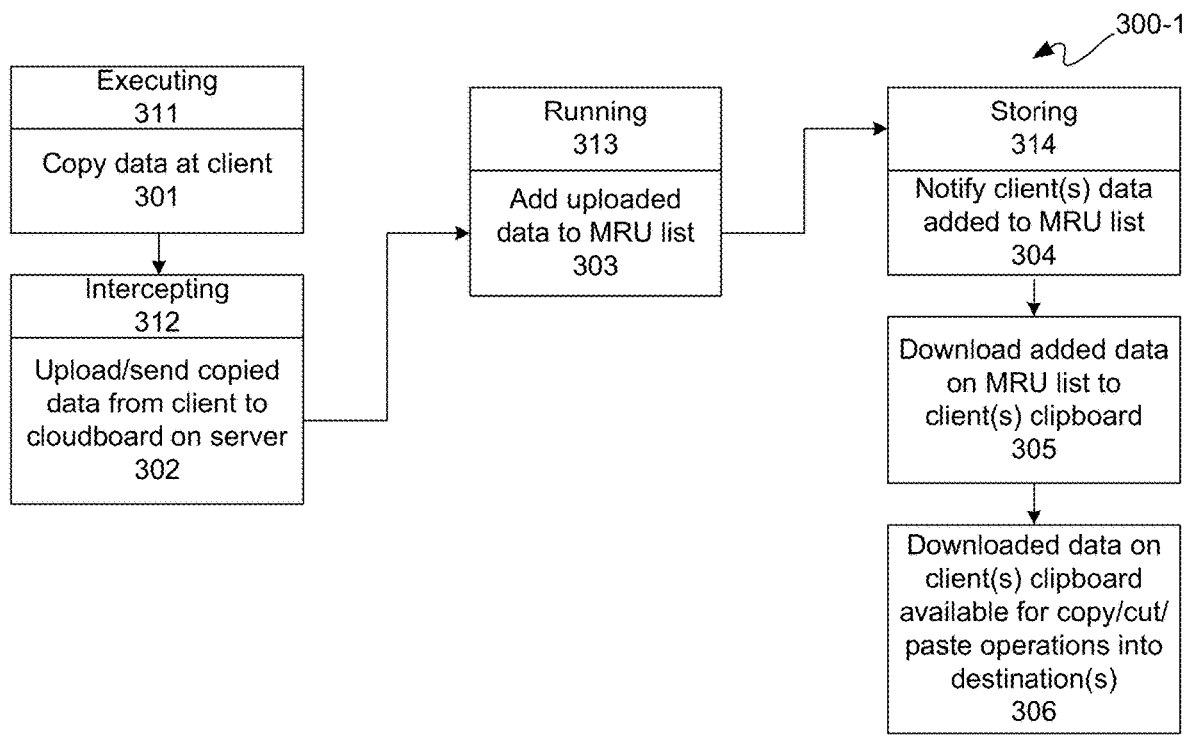
Figures 2, 3:
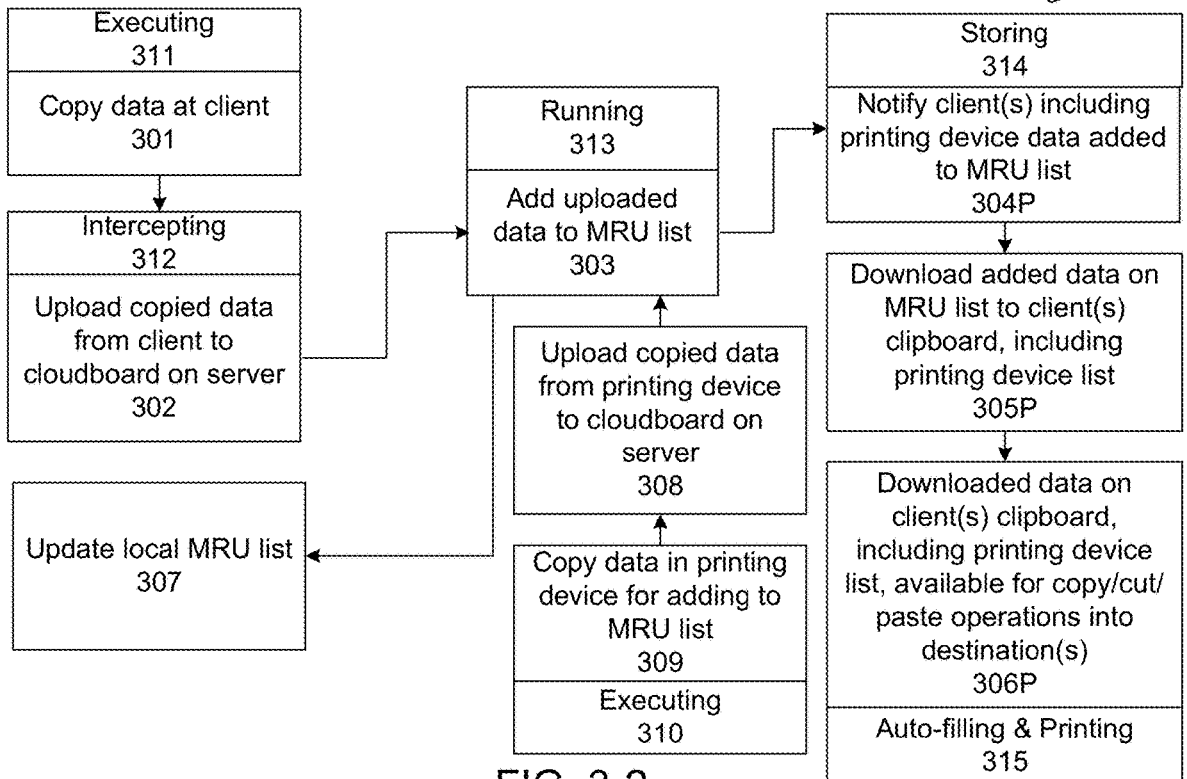

FIG. 3-1 is a flow diagram depicting an example of a process flow 300-1 for a cloudboard system 100-1 of FIG. 1-1. Process flow 300-1 is further described with simultaneous reference to FIGS. 1-1 and 3-1.

At operation 311, a client service 105 may be executed on a client device of a group 106 of client devices 101. At operation 301, data may be copied at a client device 101. As an example, a user may do a Ctrl-C or other copy action of some text at a desktop computer, mobile device or other processor-based device.

At operation 312, data going to or from a clipboard store of a client device 101 may be intercepted. At operation 302, such copied data intercepted may be uploaded or otherwise sent to a cloudboard server 103 for adding to a most-recently-used list ("MRU list") 113 and to cloudboard store 110. Sending of intercepted data at operation 302 may be automatically sent from a client device 101 to server 103 by client service 105. By automatic, it is generally meant that no additional user intervention need be performed. In this example, after a user copies data at 301, operations at 312 and 302 may be automatically performed by client service 105. In another example, MRU list 113 and cloudboard store 110 are merged into a single functional unit. However, for purposes of clarity to delineate stored data from indexes associated with such stored data, MRU list 113 and cloudboard store 110 are parsed in this example.

At operation 313, a listing service 109 may be run on server 103. At operation 303, such listing service 109 may add uploaded data to an MRU list 113.

At operation 314, intercepted data uploaded to MRU list 113 by listing service 109 may be stored in, on or otherwise readily accessible by server 103 in an MRU list 113 made directly available to at least one other client device 101, namely at least two total, of a group 106 thereof. At operation 304, at least one other client device 101 in a group 106 may be notified of data or an item being added to MRU list 113. This notification may be simply adding an item to a local clipboard of such at least one other client device 101.

This allows a first client device 101-1 uploading data to operate with a first operation system which is different from a second client device 101-2, while allowing a user of such second client device 101-2 to locally paste such uploaded data. Moreover, such different operating systems among client devices 101 in a group 106 may have different commands for at least one of a paste, cut or copy action. At operation 305, data added to an MRU list 113 may be downloaded from a server 103 to one or more other client devices, such as a second client device 101-2. Such one or more other clients 101 of a group 106 may be communicating with a server 103. At operation 306, a copy, cut, or paste operation may be performed on downloaded data to such one or more other destination clients' clipboard storage. For example, the top item obtained from a first client device may be available for a paste action or a copy action from a local list by a second client device.

FIG. 3-2 is a flow diagram depicting an example of a process flow 300-2 for a cloudboard system 100-2 of FIG. 1-2. Process flow 300-2 is further described with simultaneous reference to FIGS. 1-2 and 3-2. However, as many of the operations between process flows 300-1 and 300-2 are the same or similar, generally only the differences are described for purposes of clarity and not limitation.

At operation 310, a control service 121 may be executed for a printing device 120, similar to executing operation 311. At operation 309, data in a printing device 120, such as by scanning, may be copied or otherwise selected for adding to an MRU list.

At operation 308, such copied data may be uploaded from printing device 120 to a cloudboard store 110 on server 103. Such uploaded data may be added to an MRU list 113 at operation 303, such as previously described.

A cloudboard client, such as printing device 120, may be notified of any updates to MRU list 113 at operation 304P, similar to operation 304. At printing device 120, such updates may be reflected on a local MRU list 123 on printing device 120, such as for a copy or paste action for example. Along those lines, a server 103 may be in communication with one or more printing devices subscribing to be notified with updates to one or more MRU lists 113. Subscribing printing devices may be notified about and receive at least one updated MRU list containing one or more new entries.

Control service 121 may be cloudboard plug-in firmware to provide a local service in printing device 120 to provide some operations described herein. Control service 121 may allow a user to see a refreshed local MRU list 123 and allow a user to make selections in such list. Control service 121 may allow the next ctrl-v or paste action to pick up the top item from local MRU list 123.

At operation 305P, data added to an MRU list 113 may be downloaded from a server 103 to one or more printing devices 120. Such one or more printing devices 120 may be of a group and may be communicating with a server 103. At operation 306P, a copy, cut, or paste operation may be performed on downloaded data to such one or more printing device's clipboard storage. As part of operation 306P, copied, cut and/or pasted data may be used for auto-filling at operation 315 of a form or template using such intercepted data by printing device 120. For example, a user may "copy" a text/string to a shared "most-recently-used list" and allow another user to browse for that text/string and retrieve same to fill out a form or field. At operation 315, such form may be printed by printing device 120 including such intercepted data copied, cut and/or pasted data.

Figures 1, 4:
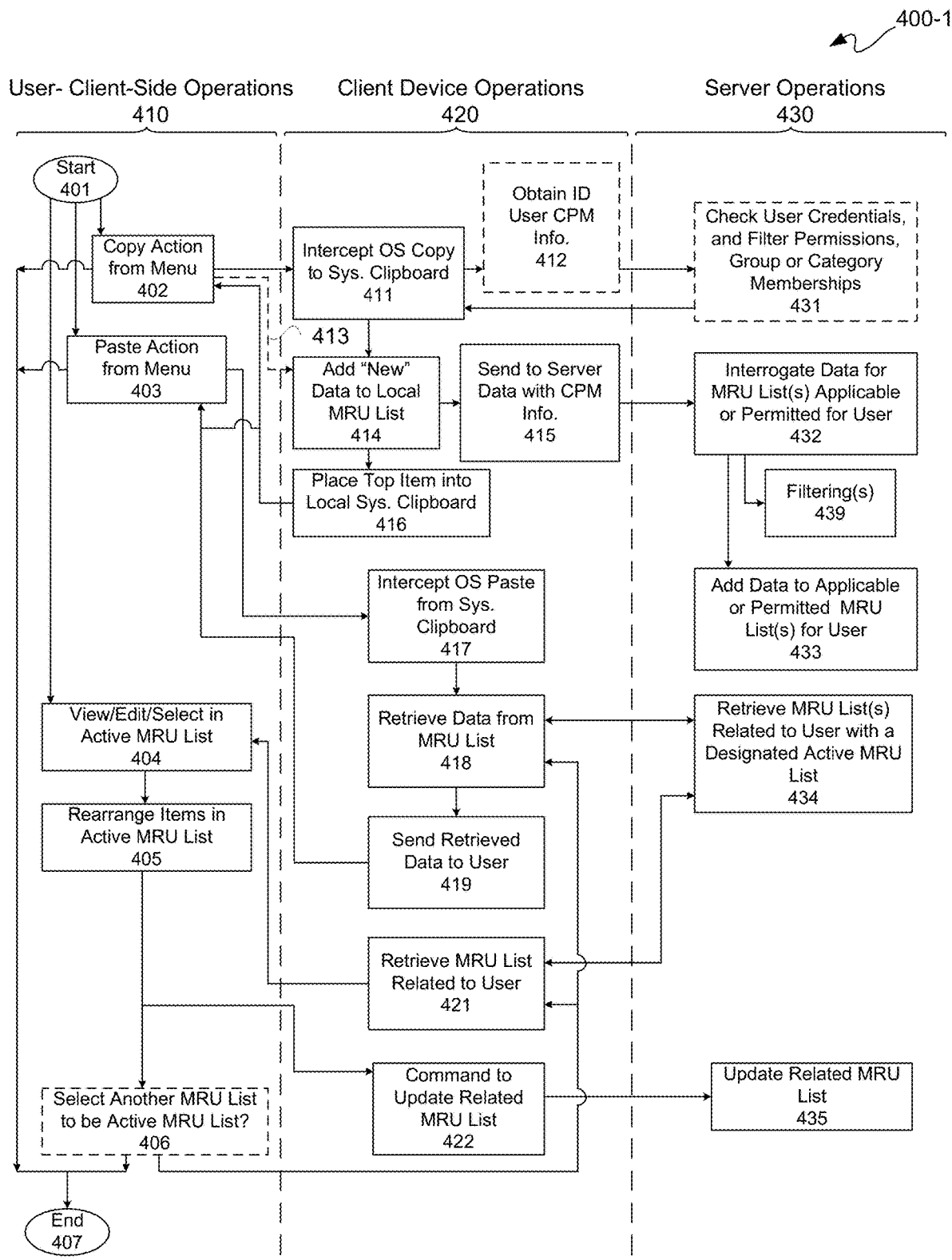
Figures 2, 4:
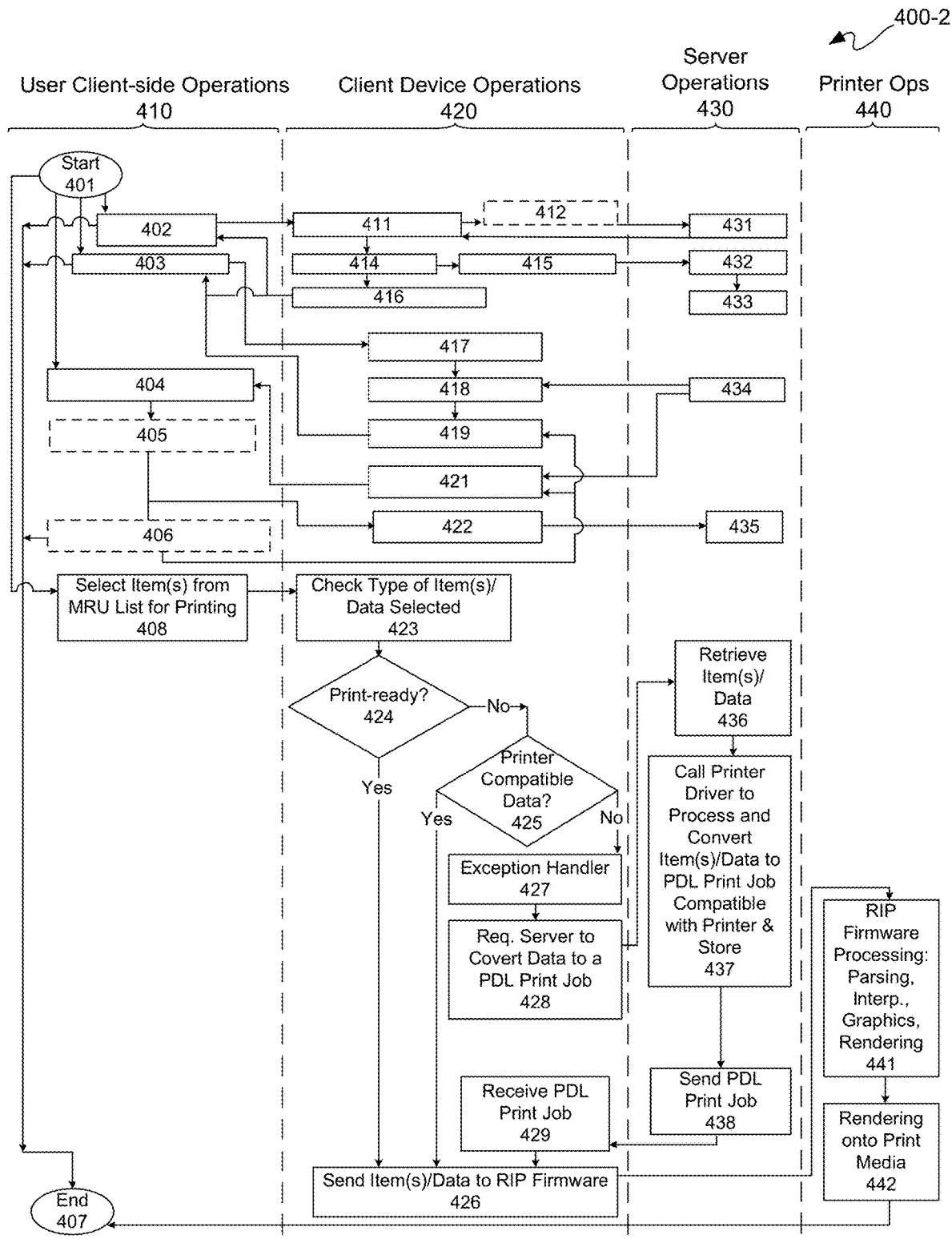

FIG. 4-1 is a flow diagram depicting an example of an operations flow 400-1 for process flow 300-1 of FIG. 3-1. Operations flow 400-1 is divided generally into user client-side operations 410, client device operations 420, and server operations 430. Though a cut action is not depicted in this example for purposes of clarity, a cut action may be used in this example. Operations flow 400-1 is further described with simultaneous reference to FIGS. 1-1 through 4-1.

At operation 401, operations flow 400-1 may be started by starting a service, which may occur at boot-up of a client device. In this example, there are three selectable user events: a copy action selectable from a menu operation 402; a paste action selectable from a menu operation 403; and a view/edit/select operation 404 in an active MRU list 405. In this example, there may be more than one MRU list, with one of such MRU lists being active at a time for purposes of user interaction.

A menu may be any of a variety of menus, including a pop-up menu, a right-click mouse menu, a pull-down menu, or other menu as part of a user interface. Such user interface may show a list of items in an active MRU list, so a user may pick or select one item as an active item for a next paste action. User may see in another user interface a list of all shared MRU lists, so that a user may select and designate one as a currently active MRU list for use in next copy/paste/cut actions.

Should a user select a copy action at operation 402, then at operation 411 a client service 105 intercepts operating system ("OS") copied data for a system clipboard of a client device 101. This intercepting may be for a client local MRU list of intercepts to or from a clipboard store. As there may be more than one client device using a cloudboard, effectively a client local MRU list may be of intercepts to or from clipboard stores respectively of at least two client devices 101 in a group 106. In this example, each item on a server-local MRU list 113 may be subject to a copy action or a cut action by at least two of client devices of a group thereof.

Furthermore, even though an entire document or file may be intercepted, intercepted data may be a segment of a document or file or an incomplete file. Along those lines, in order to preserve storage space, in an example only portions or incomplete files may be permitted from a clipboard. Thus, a copied file in one directory for example available to be pasted in another directory may be excluded from intercepting at operation 411. While a segment from a file may be intercepted at operation 411, other non-file examples may be intercepted. For example, intercepted data may be a screen shot, a portion of text from a webpage, or a portion of a displayed image. However, in other examples, intercepted data may include a complete file or a URL or other types of information.

Optionally, for security reasons, user identity credentials and permissions may be obtained at operation 412 by client service 105. Client service 105 may send such information obtained at operation 412 to cloudboard server 103 for listing service 109. At operation 431, listing service 109 may check user credentials, such as by an authentication process. If a user is authenticated, then a check of a user's permissions to MRU list(s), as well as group and/or category memberships, may be filtered. Along those lines, data may be filtered to an MRU list responsive to type of data for a category for example. Furthermore, a user authorization parameter inherent to an authenticated user may in effect filter intercepted data to provide to an MRU list, such as a trade secret MRU list for example, responsive to such a user authorization parameter.

Whether a user is authenticated or not is provided back to client service 105 along with any and all permissions and/or memberships at operation 411 to determine whether intercepted data may be further processed, and if so, what MRU list(s) can such intercepted data be added and for which groups and/or categories. This filtering information may be concatenated with intercepted data for subsequent processing.

Assuming such intercepted data passes authorization, then from operation 411 such intercepted data, along with any and all credential, permission and/or membership ("CPM") information may be sent for further processing at operation 414. At operation 414, "new" or currently intercepted data is sent to a local MRU list 111 along with CPM information. In another example, optionally operation 414 may be on a delay in order to allow a user to "take back" data, namely allow a user to assert a "take back" or delete command 413 within a set period of time prior to sending data with CPM information to server 103. At operation 416, such "new" data may be placed, such as optionally the top item, in a local system clipboard 107 in accordance with CPM information, and a copy action initiated at operation 402 may be ended or completed at operation 407.

From operation 414, at operation 415 such new data with CPM information is sent from client device 101 to server 103 for processing at operation 432. At operation 432, data and CPM information may be interrogated by server 130 by listing service 109. Such listing service 109 may interrogate intercepted data on a list from among a group of client devices for pattern detection, so as to avoid duplication of listing data and to identify usage. From such interrogation, at least one MRU list 113 may be identified as being applicable or permitted for a user responsive to CPM information.

For operation 432, one or more filtering operations 439 may be performed. For example, at a filtering operation 429, intercepted data may be filtered to an applicable MRU list responsive to data type. Along those lines, different MRU lists may be provided according to data type, or a single MRU list may be provided where such MRU list may be condensed according to data type as a search parameter.

Another filtering operation 439 may be filtering intercepted data to provide to an MRU list responsive to one or more user authorization parameters. Along those lines, different MRU lists may be provided according to one or more authorization parameters, or a single MRU list may be provided where such MRU list may be condensed according to one or more authorization parameters as a search string.

Another filtering operation 439 may be filtering intercepted data to provide to an MRU list responsive to one or more security-level access. Along those lines, different MRU lists may be provided according to one or more security levels, or a single MRU list may be provided where such MRU list may be condensed according to one or more security levels as a search string.

At operation 433, such "new" data may be added to at least one applicable or permitted MRU list 113. Intercepted data may be stored in cloudboard store 110 using a common format, such as JSON or XML for example.

If a user chooses a paste action from a menu at operation 403, then client service 105 may intercept OS paste data from an OS system clipboard at operation 417. Again, it should be understood that multiple client devices and multiple users may be using a cloudboard system, and so a paste action may be for data not sourced from a user at a client device requesting such a paste action. For example, a first client device 101-1 with a first user may provide source data, such as via a local copy action, and provide such sourced data via a cloudboard store 110 for a second client device 101-2 with a second user to paste. Furthermore, a first client device and a second client device may have different operating systems for sharing of intercepted data on a system-wide MRU list 113 among different applications.

At operation 418, a top or other data associated with paste data may be called for retrieval from an MRU list 113 by client service 105. Responsive to such a call, at operation 434, a listing service 109 may retrieve data from cloudboard store 110 in association with at least one MRU list for a client and send such retrieved data to client service 105 at operation 418.

At operation 418, retrieved data may be sent to operation 419 for sending to a user at operation 403, such as a requester or subscriber, and a paste action initiated at operation 403 may be ended or completed at operation 407.

If a user chooses to view, edit, or select an item in an active local MRU list 111 at operation 404, then an active MRU list 111 may be viewed at operation 404. If a user selects an item to be copied or pasted from such active MRU list 111, then a copy or paste operation may be performed. If a user selects to edit an active MRU list, then at operation 405 one or more items on a local active MRU list 111 may be rearranged. At operation 422, a client service 105 may provide a command to update a related system MRU list 113 in accordance with such rearrangement. At operation 435, a listing service 109 may update such a related MRU list 113 responsive to such rearrangement.

Optionally, from operation 405, a user may be provided an option at operation 406 to select another or different MRU list to be a currently active MRU list. If a user declines to select another MRU list to be active, then client service 105 may end at operation 407 or just run in a background mode. If, however, a user selects another MRU list to be active, then at operation 421 an instruction to retrieve another MRU list related to a user's selection may be sent to server 103. Responsive to such instruction issued at operation 421, such an MRU list 113 related to a user may be retrieved by listing service 109 as a designated active MRU list and provided back to client service 105 of client device 101 at operation 421. Such retrieved MRU list may be provided for viewing, editing, or selecting at operation 404.

Additionally, if another MRU list is selected at operation 406 to be active, then operations 418 and 434 may be repeated for retrieving data for such newly designated locally active MRU list for a client service. From operation 418, such newly designated active MRU list 111 may have retrieved data sent to a user at operation 419 for a clipboard 107, including for a paste action at operation 403, or a copy action at operation 402.

Referring now to FIG. 4-2, there is shown a flow diagram depicting an example of an operations flow 400-2 for process flow 300-2 of FIG. 3-2. Operations flow 400-2 includes the same operations of operations flow 400-1, which are not generally repeated for clarity, but with the following additions.

At operation 401, operations flow 400-2 may be started by starting a service, which may occur at boot-up of a client device. In this example, there are four selectable user events for user client-side operation 410, namely events 402 through 405 as previously described in addition to a select one or more items from MRU list 111 for printing 408.

In this example, there may be more than one MRU list, with one of such MRU lists being active at a time for purposes of user interaction. A printing event 408 may be selected by way of a menu, which may be any of a variety of menus, including a pop-up menu, a right-click mouse menu, a pull-down menu, or other menu as part of a user interface. A user interface may show a list of items in an active MRU list, so a user may pick or select one item as an active item for a printing operation. User may see in another user interface a list of all shared MRU lists, so that a user may select and designate one as a currently active MRU list for use in a printing operation.

Along those lines, each item on an active MRU list 111 may be subject to a copy action, a paste action, a cut action, or a print action by at least two client devices 101 of a group 106. For a printing action selected at operation 408, a check for type of one or more items or data selected from an active MRU list may be performed at operation 423 as a client device 101 operation of client device operations 420. Client device operations 420 for this example further include operations 423 through 429.

Because an MRU list may be shared by a single user from many sources or devices from a multi-login or multi-session grouping, such shared MRU list between users may be of most-recently used data. This data may or may not be print ready. After a type of data is determined at operation 423, a determination may be made at operation 424 to determine if such data is print ready.

Again, a shared MRU list may be private groupings or categories, such as departments, teams, office location, or the like. Furthermore, a shared MRU list may be a public list, where anyone can add to and copy from shared data.

An MRU list 111 overwrites a local clipboard at a client, as well as other client devices in a cloudboard network. This avoids having to have a separate storage area for an MRU list, but rather integrates an MRU list 111 into a system clipboard in client devices within a cloudboard group 106. Even though client devices may be on different platforms, a cloudboard network may be a cross-platform network, where mobile phones such as with Android or iOS, computers such as with Linux, Windows, macOS, or Chrome for example may share data with one another with an MRU list integrated into local client devices system clipboards. Furthermore, items in an MRU list may be rearranged with previous items providing some historical data or list of previous usage.

Furthermore, an MRU list is session persistent. Even if a session times out, is disconnected, or is otherwise terminated, items of data in MRU list 111 persist by way of a cloudboard store 110. This may be useful for meetings, where a user may be disconnected. Once data goes into a cloudboard store 110, such data may stay there until it eventually gets kicked out by a number of subsequent entries or additions to an MRU list 113. There may be a limited number of items in an MRU list 113 to reduce storage demands; however, a "least recently used" designation may be implemented in addition to a first-in, first-out ("FIFO") buffering, to determine which items are removed. For example, least recently used items may be purged first, and then FIFO buffering may be used secondly for purging items.

Furthermore, a client device 101 of a group 106 need not be directly connected to another client device 101 of such group 106, but may share an MRU list through a server-based cloudboard store 110. Along those lines, a single network communication connection may be maintained in contrast to explicitly communicating to several computers at once, using up resources. However, a user may have two client devices 101 at their desk with separate displays and be able to share data by and between such two client devices 101 through cloudboard store 110. Furthermore, a user may have a single client device 101 which is configured as a dual-boot or multi-OS system; however, by use of cloudboard store 110 data may be shared across such operating systems.

A re-arranging feature of an MRU list 111 allows users to bring to the top of such list data (e.g., text, image, file) that they may want next. Without this feature, the last item at the top of a list always get replaced with a new item from someone who did "ctrl-c" or "copy" last. In contrast, MRU list 111 facilitates re-use of data such as when propagating bug fixes, messages, document contents, images, details in reports or the like, and be able to view, arrange, manipulate and/or manage such data in many cross-platform computers and operating systems.

Cloudboard store 110 facilitates both maintaining and tracking of data. A maintained list of re-usable data may be made available anywhere in a group 106, and so some data may have been previously processed to be print-ready and stored in cloudboard store 110 as re-usable items.

Again, an MRU use concept is distinguishable from a FIFO concept. Most clipboards operate on a FIFO concept; however, an MRU list 113 may re-arrange items on a list based on usage, which may take priority over FIFO buffering. Thus, rather than simply keeping a chronological history of items added into a clipboard, an MRU list 111 may include a usage listing or a hybrid usage-FIFO listing.

At operation 424, if it is determined data is not print-ready data, then at operation 425 it is determined if such data is printer compatible data. Examples of printer compatible data include file formats such as image files (e.g., JPEG, TIFF, or like files), more complex app files (e.g., MS Word, PowerPoint, Excel, or like files) or PDL print jobs (e.g., PCL, XPS, PDF, or other printer file formats).

If at operation 425 it is determined that data is not print compatible, then at operation 427 an exception handler may be invoked. Such an exception handler may at operation 428 request a server, such as server 103 for example, to convert such data into a PDL print job.

Along those lines, operations 436 through 438 may be of server operations 430. At operation 436 in response to a request from operation 428, a server 103 may retrieve one or more items or data to be printed from cloudboard store 110. At operation 437, server 103 may call a printer driver 130 to process and convert such one or more items or data to a PDL print job compatible with a printing device 120. Such a printer driver 130 for example may be stored locally on server 103 to avoid having to use a printer driver on printing device 120.

A PDL print job converted at operation 437 may be stored in cloudboard store 110 at operation 437. Such stored print compatible version may be stored for re-use with avoidance of operations described herein.

At operation 438, server 103 may send such PDL print job to a requesting client device 101 for receipt of such PDL print job at operation 429. Such PDL print job may be sent at operation 426 to RIP firmware of printing device 120.

Operations 441 and 442 are of printer operations 440, such as for example of a printing device 120. At operation 441, RIP firmware may process a PDL print job. This processing as is known generally involves parsing, interpreting, graphics handling (if present), and rendering. At operation 442, printing device 120 renders onto print media such PDL print job after processing at operation 441. After printing at operation 442, operations flow 400-2 may end at operation 407.

If at operation 424 data is determined to be print ready, such as a previously generated PDL print job for example, then such data may be directly provided for sending at operation 426 for processing as previously described. If at operation 425 data is determined to be printer compatible, then such data may be directly provided for sending at operation 426 for processing as previously described.

Having a "CloudBoard Server" listing service 109 manage one or more MRU lists 113 in a cloud or network server 103, and client devices 101, which may have same or different operating systems, each have a "CloudBoard Client" service 105 that can send any of supported data in their local clipboard to a "CloudBoard Server's" cloudboard store 110. Each CloudBoard Client service 105 may be particular to each operating system of a client device 101 to be able to retrieve data from a local clipboard or from a provided user interface that a user can add text or data into. CloudBoard Client service 105 may use one or more APIs for access to a local clipboard and data. For an example where an API to an OS is not available, a CloudBoard Client service 105 may include a user interface for users to add data into clipboard 107 and for sending to CloudBoard Server listing service 109 and cloudboard store 110 for subscribing clients.

For example, computers, including dual-boot or multi-OS systems, may each have an instance of CloudBoard Client service 105 that can subscribe to CloudBoard Server listing service 109 for one or more MRU lists 113 for a user, sets of users, departments, teams, or other categories. Each such subscriber may receive updated MRU list 113 data. Such updates may be in a form of network messaging, including UDP, Web Services, or other networking protocols.

Any shared data, which may come from multiple client devices 101, may be gathered, itemized and organized in MRU list 113 in a clipboard-style service indexing cloudboard storage 110 and allow such items and corresponding data to be accessible anywhere in a group 106.

In a printing device version, printers may have access to a shared MRU list 113, where users can pick data (e.g., text, image, or other file). Such selected data can be used to fill forms or fields in using a printer panel, or for use as a watermark or stamp; or selected data can be printed directly from an MRU list 113.

A cloudboard system makes availability of cloudboard data transparent and automated for each user, where users may continue using "copy", "cut", "paste", or same or similar operations in a familiar manner, and all available cloudboard data (e.g., text, image, or other file) accessible throughout a cloudboard system 100. A subsequent "paste" or "ctrl-v" can thus result in what was previously "copied" or "ctrl-c'd" from another location. With flexibility of rearranging previous entries in an MRU list 111, flexibility for re-use of various text (e.g., code, descriptions, comments, or other text) to be copied to one or more different places in another or same client device 101.

In order to address security concerns, CloudBoard system 101 may provide configurable settings to alert users about data being accessed from or shared to a CloudBoard MRU list 113. Users may be warned or notified every time "copy" or "ctrl-c" is intercepted and a data is to be copied. This warning can be turned ON for a certain time period, like minutes, hours, or days. This Warning can be turned OFF for a certain period of time, like minutes, hours, or days.

CloudBoard system 101 may allow for data to expire and be deleted from a CloudBoard MRU list 113 and cloudboard store 110. CloudBoard system 101 may allow for data to be uploaded but allow a user to "take it back" or delete same from CloudBoard system 101 within some configurable time, such as for example 30 seconds, 5 minutes, or other amount of time.

Because one or more of the examples described herein may be implemented in using a network, such as for a cloud-based SaaS implementation, or a computing system, as well as a mobile device and an MFP, a detailed description of examples of each is provided. However, it should be understood that other configurations of one or more of these examples may benefit from the technology described herein.

Figure 5:
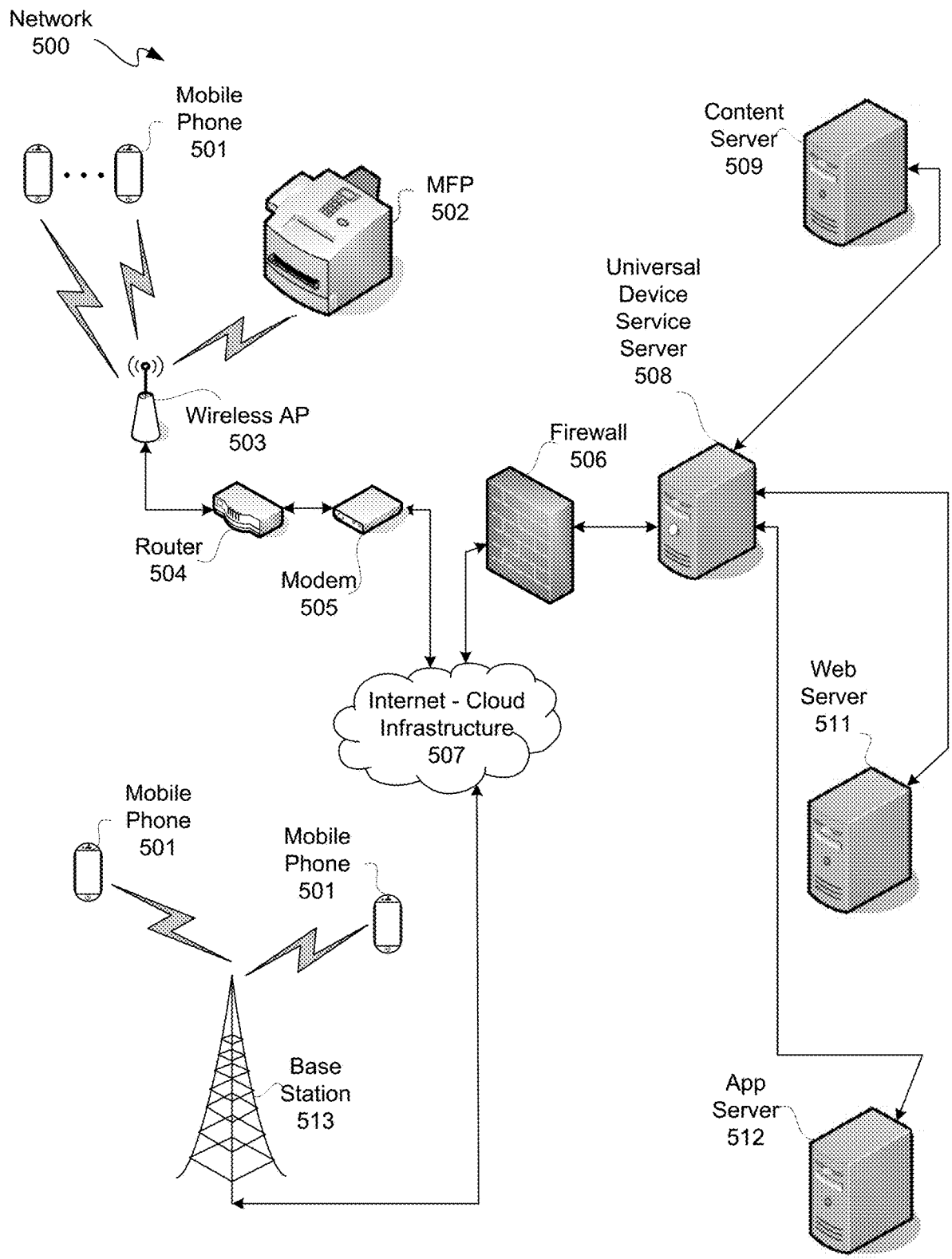
FIG. 5 is a pictorial diagram depicting an example of a network.

FIG. 5 is a pictorial diagram depicting an example of a network 500, which may be used to provide an SaaS platform for hosting a service or micro service for use by a user device, as described herein. Along those lines, network 500 may include one or more mobile phones 501, pads, notebooks, and/or other web-usable devices in wired and/or wireless communication with a wired and/or wireless access point ("AP") 503 connected to or of a wireless router 504 in communication with a modem 505. Furthermore, one or more of such web-usable wireless devices 501 may be in wireless communication with a base station 513. Additionally, a desktop computer and/or an MFP 502, each of which may be web-usable devices, may be in wireless and/or wired communication to and from router 504 via wireless AP 503.

Wireless AP 503 may be connected for communication with a router 504, which in turn may be connected to a modem 505. Modem 505 and base station 513 may be in communication with an Internet-Cloud infrastructure 507, which may include public and/or private networks.

A firewall 506 may be in communication with such an Internet-Cloud infrastructure 507. Firewall 506 may be in communication with a universal device service server 508. Universal device service server 508 may be in communication with a content server 509, a web server 511, and/or an app server 512. App server 512, as well as a network 500, may be used for downloading an app or one or more components thereof for accessing and using a service or a micro service as described herein, such as a client service for example.

Figure 6:
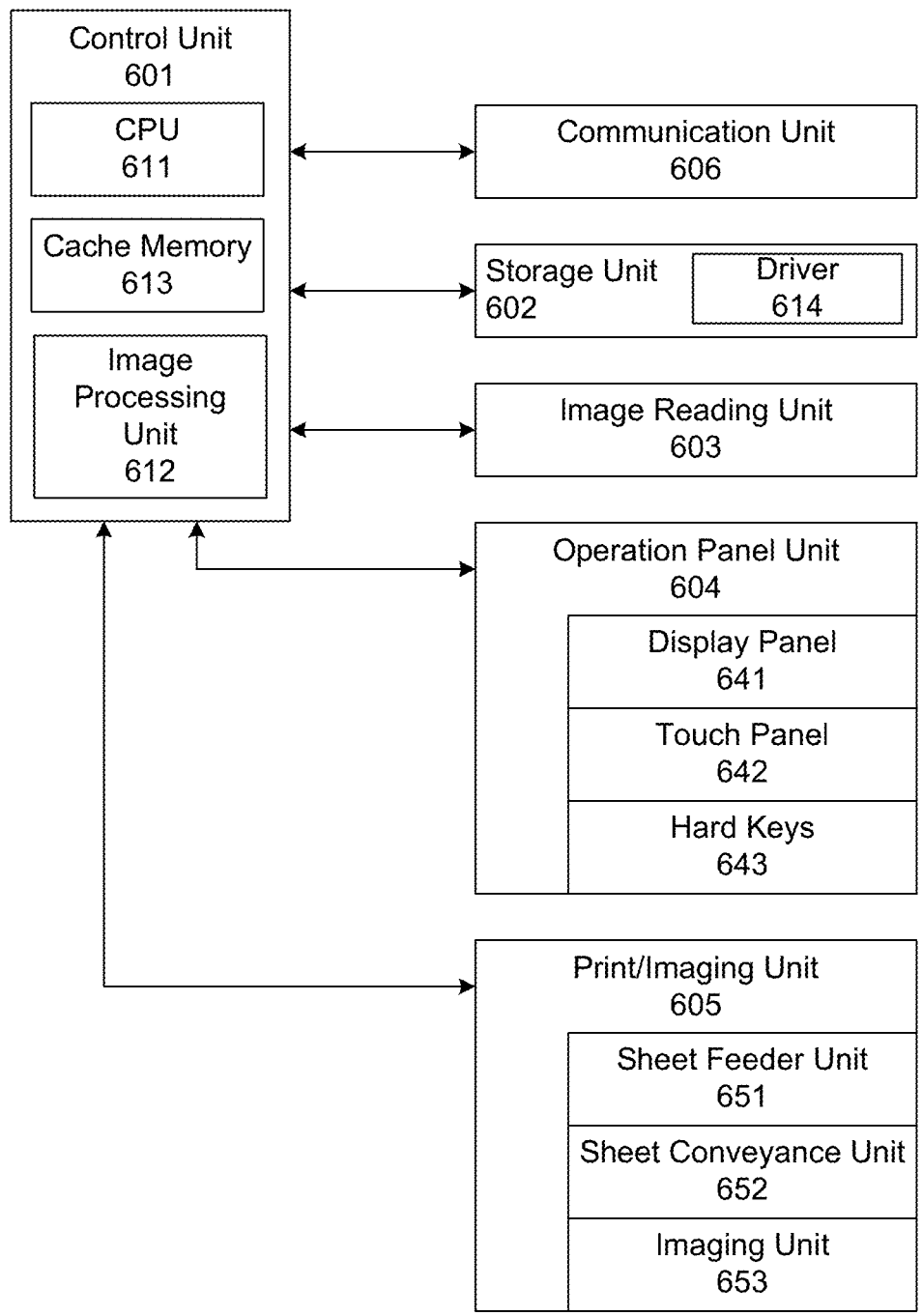
FIG. 6 is a block diagram depicting an example of a multi-function printer.

FIG. 6 is a block diagram depicting an example of a multi-function printer (MFP) 600. MFP 600 is provided for purposes of clarity by way of non-limiting example. MFP 600 is an example of a printing device.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Storage unit 602 may include ROM, RAM, and large capacity storage memory, such as for example an HDD or an SSD. Storage unit 602 may store various types of data and control programs, including without limitation a printer driver 614.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. In another example, control unit 601 may be separate from MFP 600. Many known details regarding MFP 600 are not described for purposes of clarity and not limitation.

Figure 7:
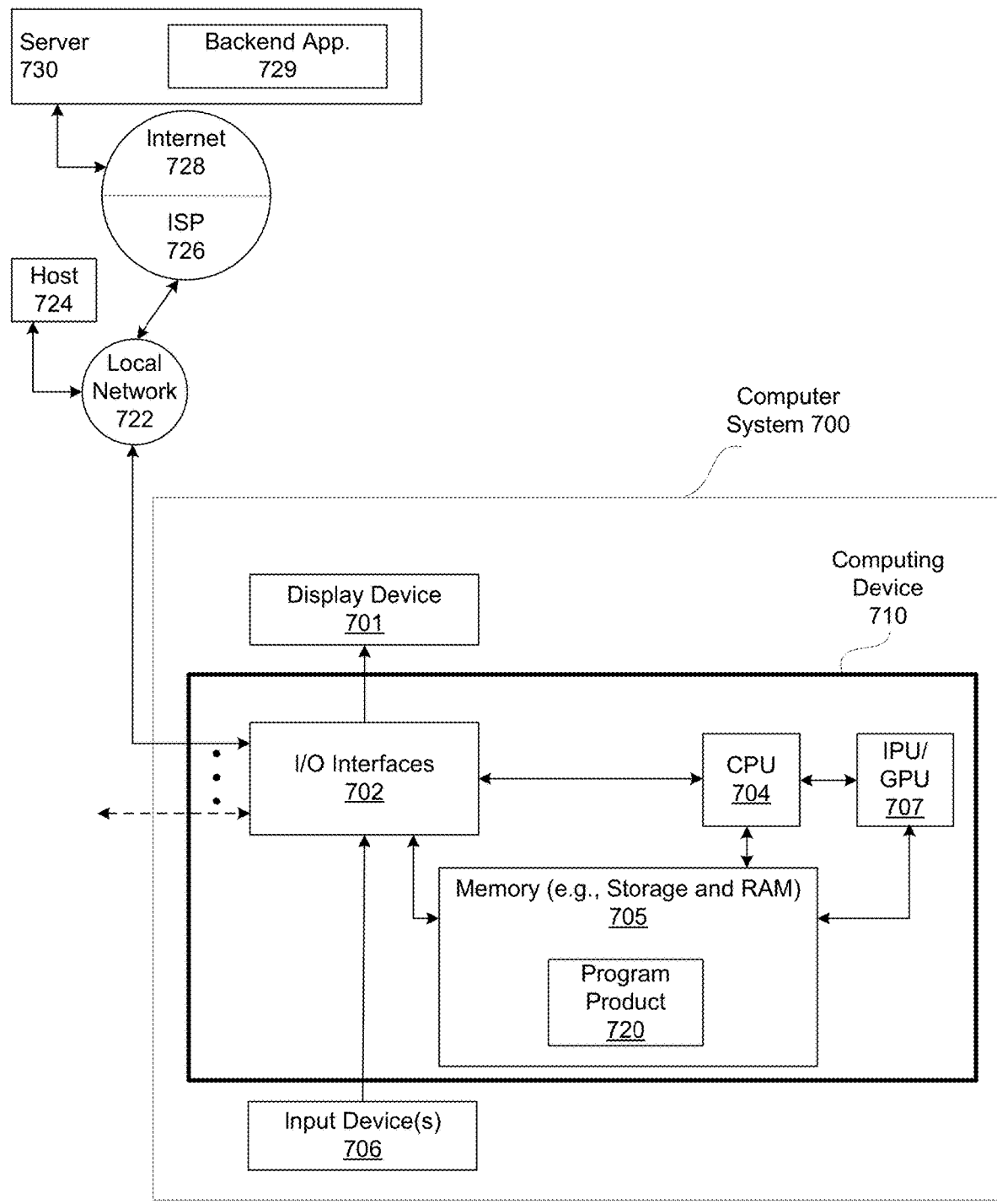
FIG. 7 is a block diagram depicting an example of a networked computer system.

FIG. 7 is a block diagram depicting an example of a networked computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image or graphics processing unit ("IPU/GPU") 707 coupled to CPU 704 and one or more peripheral cards 709 coupled to I/O interface 702. Along those lines, programmed computing device 710 may include graphics memory 708 coupled to optional IPU/GPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU/GPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

Server 730 may include a backend application 729. Examples of server 730 may include a CloudBoard server 103 running a listing service 109 as a backend application.

Figure 8:
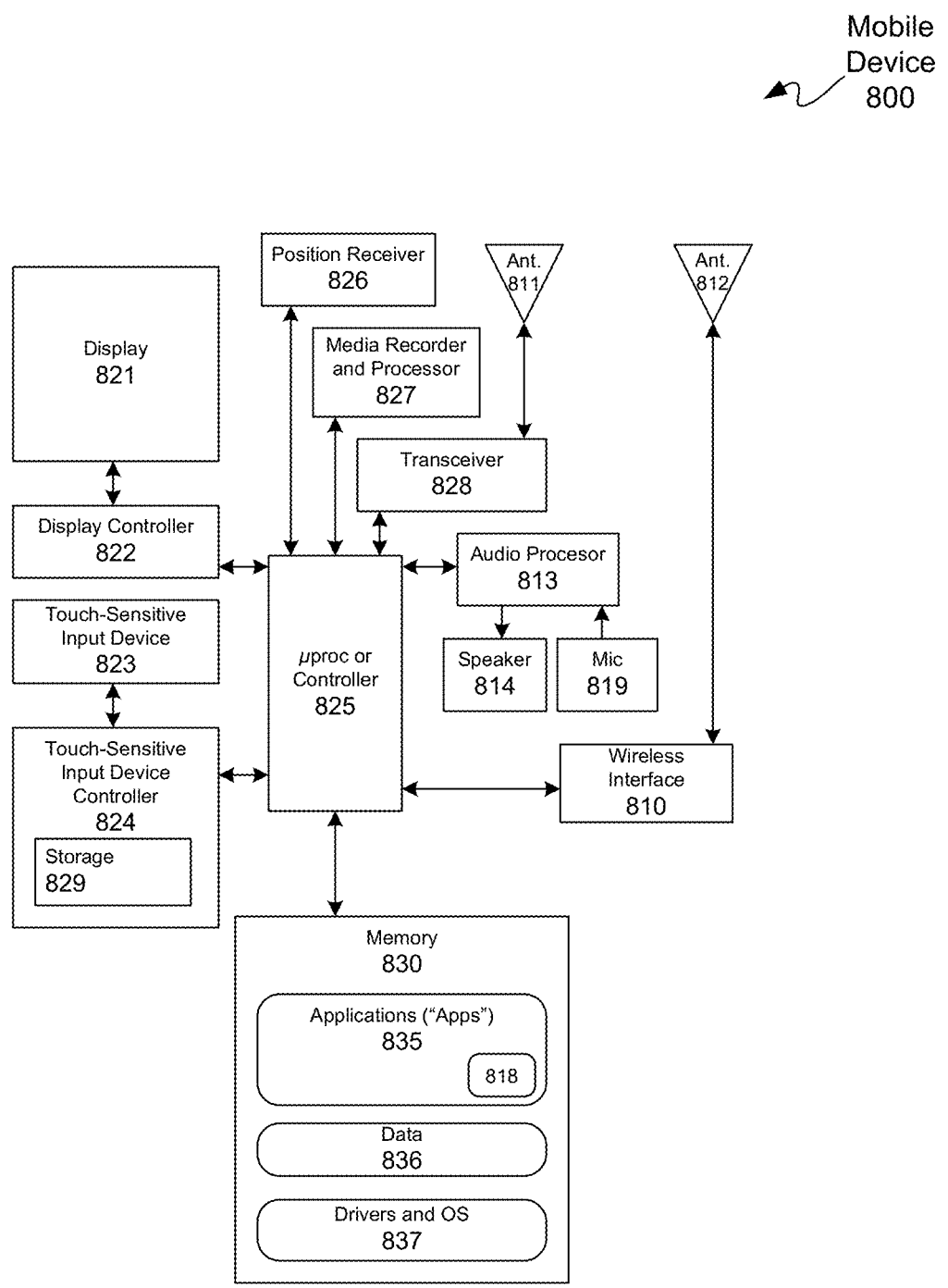
FIG. 8 is block diagram depicting an example of a portable communication device.

FIG. 8 is block diagram depicting an example of a portable communication device ("mobile device") 800. Mobile device 800 may be an example of a mobile device, as previously described.

Mobile device 800 may include a wireless interface 810, an antenna 811, an antenna 812, an audio processor 813, a speaker 814, and a microphone ("mic") 819, a display 821, a display controller 822, a touch-sensitive input device 823, a touch-sensitive input device controller 824, a microprocessor or microcontroller 825, a position receiver 826, a media recorder 827, a cell transceiver 828, and a memory or memories ("memory") 830.

Microprocessor or microcontroller 825 may be programmed to control overall operation of mobile device 800. Microprocessor or microcontroller 825 may include a commercially available or custom microprocessor or microcontroller.

Memory 830 may be interconnected for communication with microprocessor or microcontroller 825 for storing programs and data used by mobile device 800. Memory 830 generally represents an overall hierarchy of memory devices containing software and data used to implement functions of mobile device 800. Data and programs or apps as described hereinabove may be stored in memory 830.

Memory 830 may include, for example, RAM or other volatile solid-state memory, flash or other non-volatile solid-state memory, a magnetic storage medium such as a hard disk drive, a removable storage media, or other suitable storage means. In addition to handling voice communications, mobile device 800 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 830 stores drivers, such as I/O device drivers, and operating system programs ("OS") 837. Memory 830 stores application programs ("apps") 835 and data 836. An app 818 of apps 835 may be a CloudBoard Client service. Data 836 may include application program data, such as a clipboard data of clipboard 107 and items of MRU list 111.

I/O device drivers may include software routines accessed through microprocessor or microcontroller 825 or by an OS stored in memory 830. Apps, to communicate with devices such as the touch-sensitive input device 823 and keys and other user interface objects adaptively displayed on a display 821, may use one or more of such drivers.

Mobile device 800, such as a mobile or cell phone, includes a display 821. Display 821 may be operatively coupled to and controlled by a display controller 822, which may be a suitable microcontroller or microprocessor programmed with a driver for operating display 821.

Touch-sensitive input device 823 may be operatively coupled to and controlled by a touch-sensitive input device controller 824, which may be a suitable microcontroller or microprocessor. Along those lines, touching activity input via touch-sensitive input device 823 may be communicated to touch-sensitive input device controller 824. Touch-sensitive input device controller 824 may optionally include local storage 829.

Touch-sensitive input device controller 824 may be programmed with a driver or application program interface ("API") for apps 835. An app may be associated with a service, as previously described herein, for use of a SaaS.

One or more aspects of above-described apps may operate in a foreground or background mode.

Microprocessor or microcontroller 825 may be programmed to interface directly touch-sensitive input device 823 or through touch-sensitive input device controller 824. Microprocessor or microcontroller 825 may be programmed or otherwise configured to interface with one or more other interface device(s) of mobile device 800. Microprocessor or microcontroller 825 may be interconnected for interfacing with a transmitter/receiver ("transceiver") 828, audio processing circuitry, such as an audio processor 813, and a position receiver 826, such as a global positioning system ("GPS") receiver. An antenna 811 may be coupled to transceiver 828 for bi-directional communication, such as cellular and/or satellite communication.

Mobile device 800 may include a media recorder and processor 827, such as a still camera, a video camera, an audio recorder, or the like, to capture digital pictures, audio and/or video. Microprocessor or microcontroller 825 may be interconnected for interfacing with media recorder and processor 827. Image, audio and/or video files corresponding to the pictures, songs and/or video may be stored in memory 830 as data 836.

Mobile device 800 may include an audio processor 813 for processing audio signals, such as for example audio information transmitted by and received from transceiver 828. Microprocessor or microcontroller 825 may be interconnected for interfacing with audio processor 813. Coupled to audio processor 813 may be one or more speakers 814 and one or more microphones 819, for projecting and receiving sound, including without limitation recording sound, via mobile device 800. Audio data may be passed to audio processor 813 for playback. Audio data may include, for example, audio data from an audio file stored in memory 830 as data 836 and retrieved by microprocessor or microcontroller 825. Audio processor 813 may include buffers, decoders, amplifiers and the like.

Mobile device 800 may include one or more local wireless interfaces 810, such as a WiFi interface, an infrared transceiver, and/or an RF adapter. Wireless interface 810 may provide a Bluetooth adapter, a WLAN adapter, an Ultra-Wideband ("UWB") adapter, and/or the like. Wireless interface 810 may be interconnected to an antenna 812 for communication. As is known, a wireless interface 810 may be used with an accessory, such as for example a hands-free adapter and/or a headset. For example, audible output sound corresponding to audio data may be transferred from mobile device 800 to an adapter, another mobile radio terminal, a computer, or another electronic device. In another example, wireless interface 810 may be for communication within a cellular network or another Wireless Wide-Area Network (WWAN).

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A system, comprising:
    a client service executable on a client device of a group of client devices to intercept data going to or from a clipboard store of the client device and to send the intercepted data to a server without user intervention;
    the server configured for communication with the client device having a listing service for storing the intercepted data in a list on or accessible by the server for direct availability to at least two in the group of client devices;
    a printing device of the group of client devices configured for communication with the server and configured to display the list of the intercepted data for selection of one or more print-possible data items thereon;
    the printing device configured to cause the one or more print-possible data items selected to be download to the printing device; and
    the printing device configured to translate the print-possible data into a printer-dependent data format for printing.

2. The system according to claim 1, wherein the client device is a computer, tablet, or mobile phone having the clipboard store.

3. The system according to claim 2, wherein the list is a most-recently-used list of intercepts to or from clipboard stores respectively of the at least two of the group of client devices.

4. The system according to claim 3, wherein the intercepted data is a screen shot.

5. The system according to claim 3, wherein the intercepted data is a segment of text or a portion of an image from a file.

6. The system according to claim 5, wherein each item on the most-recently-used list is subject to a copy action or a cut action by the at least two of the group of client devices.

7. The system according to claim 6, wherein the client device is a first client device, the system further comprising:
    a second client device of the group of client devices for communication with the server; and
    wherein the each item obtained from the first client device on the most-recently-used list is available for a paste action by the second client device.

8. The system according to claim 7, wherein the first client device and the second client device have different operating systems for sharing of the intercepted data on the list among different applications.

9. The system according to claim 8, wherein the server is configured to interrogate the intercepted data on the list among the group of client devices for pattern detection.

10. A method, comprising:
    executing a client service on a client device of a group of client devices;
    intercepting data going to or from a clipboard store of the client device;
    sending the intercepted data automatically from the client device to a server;
    running a listing service on the server; and
    storing the intercepted data by the listing service on or accessible by the server in a list directly available to at least two in the group of client devices
    communicating between the server and a printing device of the group of client devices;
    display the list of the intercepted data on by the printing device for selection of one or more print-possible data items therefrom;
    downloading the one or more print-possible data items selected by and to the printing device; and
    translating the print-possible data by the printing device into a printer-dependent data format for printing.

11. The method according to claim 10, further comprising filtering the intercepted data to the list responsive to type of the intercepted data.

12. The method according to claim 10, wherein the intercepted data is stored using a common format.

13. The method according to claim 12, where the common format is JSON or XML.

14. The method according to claim 10, further comprising filtering the intercepted data to provide to the list responsive to a user authorization parameter.

15. The method according to claim 10, further comprising maintaining the list as a most-recently-used list of intercepts to or from clipboard stores respectively of the at least two of the group of client devices.

16. The method according to claim 15, wherein a top item on the most-recently-used list is subject to a copy action or a cut action.

17. The method according to claim 16, wherein the client device is a first client device, the method further comprising:
   communicating with the server by a second client device of the group of client devices;
   wherein the top item obtained from the first client device is available for a paste action or the copy action from the list by the second client device; and
   wherein operating systems among the first client device and the second client device are different from one another having different commands for at least one of the paste action or the copy action.

18. The method according to claim 10, further comprising controlling access to the list by the server.

19. The method according to claim 18, wherein the server is a cloud-based or enterprise network-based server.

20. The method according to claim 18, further comprising filtering the intercepted data according to security-level access.

* * * * *